US012640486B2

(12) United States Patent
Hastürkoglu et al.

(10) Patent No.: US 12,640,486 B2
(45) Date of Patent: May 26, 2026

(54) RADIATOR AS WELL AS ANTENNA

(71) Applicant: Telefonaktiebolaget LM Ericsson (publ), Stockholm (SE)

(72) Inventors: Sertan Hastürkoglu, Munich (DE); Andreas Scheyer, Tuntenhausen (DE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 43 days.

(21) Appl. No.: 18/710,367

(22) PCT Filed: Dec. 15, 2021

(86) PCT No.: PCT/EP2021/085824
§ 371 (c)(1),
(2) Date: May 15, 2024

(87) PCT Pub. No.: WO2023/110068
PCT Pub. Date: Jun. 22, 2023

(65) Prior Publication Data

US 2025/0023248 A1 Jan. 16, 2025

(51) Int. Cl.
*H01Q 13/10* (2006.01)
*H01Q 1/24* (2006.01)
*H01Q 19/10* (2006.01)

(52) U.S. Cl.
CPC ............. *H01Q 13/10* (2013.01); *H01Q 1/246* (2013.01); *H01Q 19/10* (2013.01)

(58) Field of Classification Search
CPC ............ H01Q 1/246; H01Q 1/36; H01Q 9/04; H01Q 13/10; H01Q 19/10; H01Q 19/104; H01Q 21/24
See application file for complete search history.

(56) References Cited

U.S. PATENT DOCUMENTS

2011/0012788 A1 1/2011 Rowell et al.
2018/0358706 A1 12/2018 Kildal et al.

FOREIGN PATENT DOCUMENTS

FR 2841390 A1 12/2003
WO WO-2017086855 A1 * 5/2017 ........... H01Q 21/062
WO 2020228275 A1 11/2020

OTHER PUBLICATIONS

Hasturkoglu, et al., "A Wideband Automotive Antenna for Actual and Future Mobile Communication 5G/LTE/WLAN with Low Profile," 11th European Conference on Antennas and Propagation, 2017, 4 pages.

(Continued)

*Primary Examiner* — Hoang V Nguyen
(74) *Attorney, Agent, or Firm* — Withrow & Terranova, PLLC

(57) ABSTRACT

A radiator for an antenna, comprising a radiator head with an active radiation area having a first section and at least one second section, wherein the first section and the at least one second section are conductively connected forming a dual polarized radiator together, and wherein the first section lies within a first plane and the at least one second section lies within a second plane offset to the first plane. Further, an antenna and a mobile communication cell site.

19 Claims, 5 Drawing Sheets

(56) References Cited

OTHER PUBLICATIONS

Jain, et al., "Wideband circularly polarized magnetoelectric dipole antenna with I-slot for C-band applications," Journal of Computational Electronics, vol. 18, Issue 2, Dec. 19, 2018, Springer, pp. 660-670.

King, et al., "Transmission-Line Missile Antennas," Technical Report 436-58 (14), Office of Science and Technical Information, Nov. 20, 1958, UNT Libraries Government Documents Department, 26 pages.

Li, et al., "Wideband Dual-Polarized Patch Antenna With Low Cross Polarization and High Isolation," IEEE Antennas and Wireless Propagation Letters, vol. 11, 2012, pp. 427-430.

Liu, et al., "A Differentially Fed Dual-Polarized Slot Antenna With High Isolation and Low Profile for Base Station Application," IEEE Antennas and Wireless Propagation Letters, vol. 18, Issue 2, Feb. 2019, pp. 303-307.

International Search Report and Written Opinion for International Patent Application No. PCT/EP2021/085824, mailed Aug. 5, 2022, 13 pages.

* cited by examiner

RADIATOR AS WELL AS ANTENNA

This application is a 35 U.S.C. § 371 national phase filing of International Application No. PCT/EP2021/085824, filed Dec. 15, 2021, the disclosure of which is incorporated herein by reference in its entirety.

TECHNICAL FIELD

The invention relates to a radiator for an antenna, and antenna for a mobile communication cell site as well as a cell site.

BACKGROUND

The requirements for mobile communication antennas rise constantly. WO 2020/228275 A1 shows an example of a radiator for such an antenna. In the future, antennas have to operate over a wide frequency range, whereas the space available for the antennas at the cell site does not increase. Thus, the radiators of the antennas have to become smaller. At the same time, manufacturing the smaller radiators shall not lead to increased costs.

SUMMARY

It is an object of the invention to provide a radiator for an antenna, in particular for a mobile communication cell site having a compact design without a deterioration in radiation properties.

For this purpose, a radiator for an antenna is provided. The radiator comprises a radiator head with an active radiation area having a first section and at least one second section. The first section and the at least one second section are conductively connected forming a dual polarized radiator together, and wherein the first section lies within a first plane and the at least one second section lies within a second plane offset to the first plane.

By providing sections of the active radiation area closer to the reflector—compared to other parts of the active radiation area, in particular the majority of the active radiation area—a stronger coupling between these sections and the reflector is achieved. This leads to radiation properties similar to that of larger active radiation areas extending only in a single plane.

Thus, by dividing the active radiation area in sections in two different planes, the overall size of the active radiation area can be reduced without deteriorating the radiation characteristics.

All second sections may lie in the same second plane and/or the first plane and the second plane are parallel to one another.

In particular, the first section and the at least one second section do not overlap.

In order to further improve the radiation characteristics, the second plane may lie below the first plane and/or the offset may have a size between λ/25 and λ/15, in particular of λ/20, with λ being the wavelength of the center frequency of the design frequency range.

In particular, "below" meaning closer to a reflector when the radiator is mounted in an antenna.

In an aspect, the first section accounts for between 60% and 85% of the active radiation area, improving the radiation characteristics further.

In an embodiment, the active radiation area has a rectangular contour, in particular a square contour in a top view and/or wherein the radiation area is located on the top side of the radiator head, thus providing a small radiator.

For example, an edge of the active radiation area has a length between λ/2 and λ/4, in particular of λ/3, and/or between 25 mm and 30 mm, in particular of 28 mm for a frequency of 3 GHz, leading to a very compact radiator.

In order to reduce disturbances in the radiation characteristics, the at least one second section may be adjoining to the edge of the radiation area, in particular adjoining to a corner of the active radiation area.

In particular, at each corner of the active radiation area a second section is provided and/or the first section has cross shaped contour in the top view.

In an aspect, the at least one second section has a rectangular shape, in particular a square shape, particularly with an edge length between λ/11 and λ/9, in particular of λ/10. The square shape allows an advantageous symmetry of the active radiation area.

In an embodiment, the radiator head comprises two main slots in the first section, in particular wherein each of the main slots extend parallel to an edge of the active radiation area, includes the centroid of the active radiation area and/or extends partially in a region between two second sections. The slots improve the characteristics of the radiator as a dual polarized radiator. In particular, the main slots define four radiation sections. The four radiation sections may be regarded as dipole arms and the dual polarized radiator as two dipoles.

Radiation sections may also comprise characteristics of a "patch" radiator.

The main slots may extend parallel to edge of active radiation area and/or the main slots have a length between λ/3 and λ/2, in particular of λ/4.

For further improved radiation characteristics, at each end of the main slots, an end slot is provided extending transversely, in particular perpendicularly to the respective slot.

The length of each end slot may be between λ/9 and λ/11, in particular it may be λ/10. The length of the end slots may equal the length of the edge of one of the at least one second section.

In an embodiment, the radiator head comprises sidewalls at least parts of the edge of the active radiation area, in particular at the edges adjoining the first sections and/or at the edges adjoining the second sections. The sidewalls provide a design mean to tune the radiation characteristics.

The sidewalls may be perpendicular to the first plane.

In an aspect, the radiator head comprises at least one transition section connecting the first section to one second section, wherein the at least one transition section extends perpendicularly between the first plane and the second plane or wherein the transition section is sloping downwards from the first section outwards. The angle of the transition section is used to influence the radiation characteristic of the radiator.

In particular, when the transition section is not perpendicular to the first plane, it accounts for space of the active radiation area.

In an embodiment, the radiator comprises a radiator feed connected to the radiator head, wherein the radiator feed extends at an oblique angle or orthogonally to the first plane. This way, the radiator feed is used to influence the radiation characteristic or does not disturb the radiation characteristic.

In order to provide a cost efficient way of coupling, the radiator feed may comprise at least two legs connected to one of the pair of radiation sections of the radiator head each, in particular wherein the radiator feed may comprise four legs, each connected to a different one of the radiation sections of the active radiation area.

For a very cost efficient radiator, the radiator is made of a single piece, in particular by die-casting, deep-drawing, as a stamped-bent part or as a metallized injection-molded plastic.

In an aspect, the radiator head, in particular the full radiator has a four-fold rotational symmetry around the centroid of the active radiation area, further improving the radiation characteristics.

For above mentioned purpose, an antenna is provided, in particular for a mobile communication cell site. The antenna comprises at least one radiator as explained above and a reflector.

The features and advantages mentioned with respect to the radiator also apply to the antenna and vice versa.

In an aspect, the first plane is further away from the reflector than the second plane, in particular wherein the second plane lies between 40% and 80%, in particular at 70% of the distance seen from the reflector between the first plane and the reflector. This way, the radiation characteristics of the antenna are improved.

In an embodiment, the antenna comprises a support for the radiator, wherein the radiator feed is connected to the support, in particular wherein a balun structure is provided at the support, the balun structure galvanically connecting the legs of the radiator feed associated with the same pair of radiation sections, e.g. the same dipole. Providing the balun structure at the support reduces the complexity of the radiator.

The balun structure may connect the legs to a signal source.

Further, for above mentioned purpose, a mobile communication cell site is provided comprising an antenna as explained above.

BRIEF DESCRIPTION OF THE DRAWINGS

Further features and advantages will be apparent from the following description as well as the accompanying drawings, to which reference is made. In the drawings.

DETAILED DESCRIPTION

Figure 1:
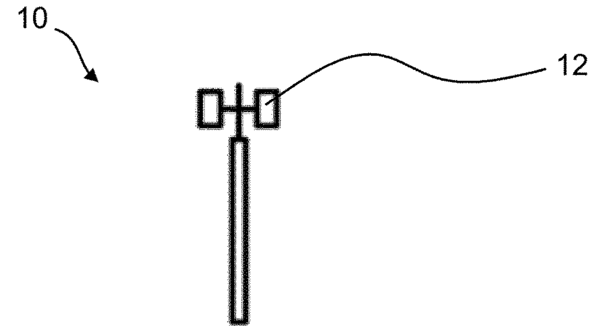
FIG. 1: shows a mobile communication cell site according to the invention with two antennas according to the invention.

FIG. 1 shows a mobile communication cell site 10 having at least one antenna 12.

Figure 2:
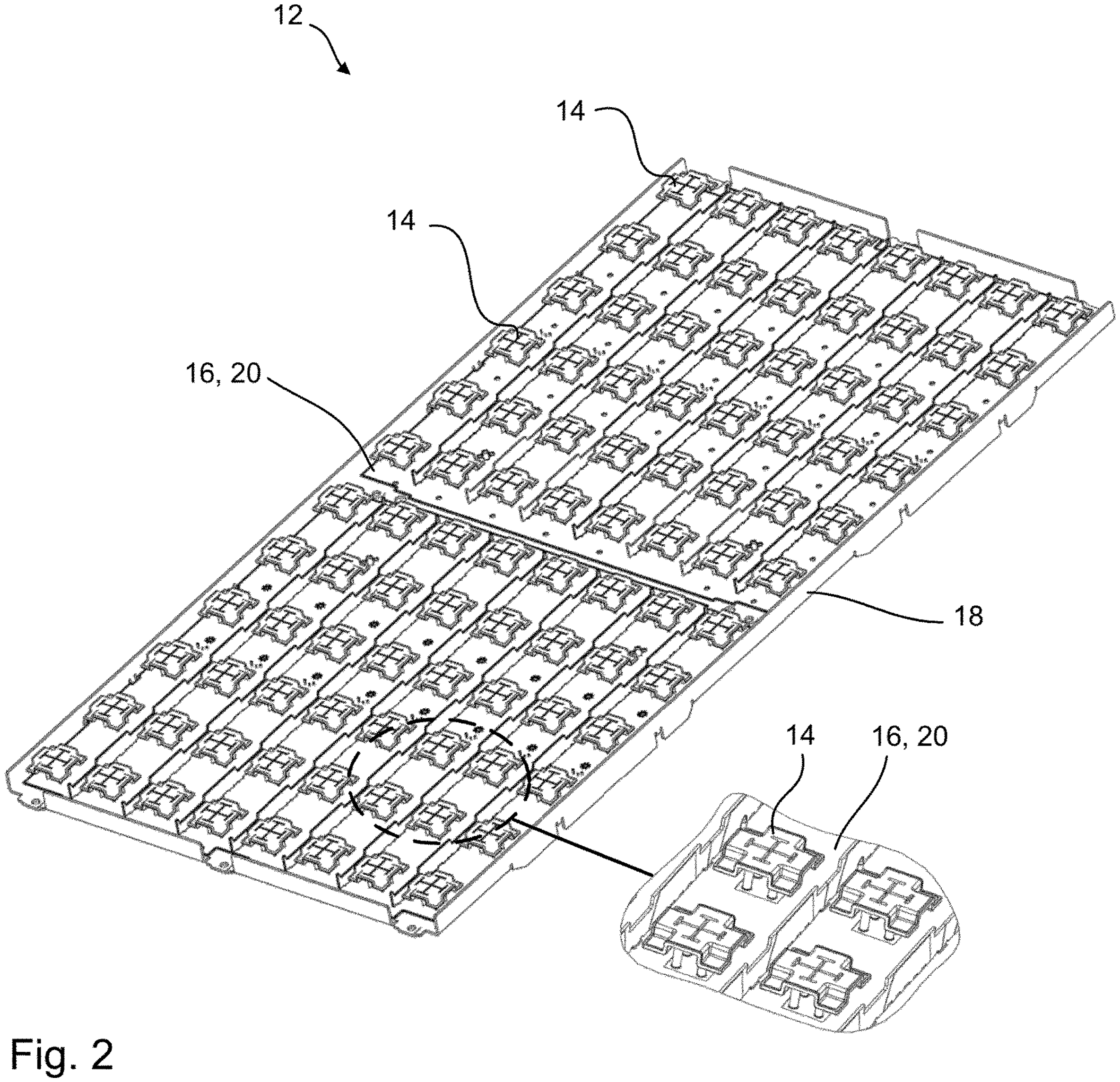
FIG. 2: shows one of the antennas of FIG. 1 in a perspective view with radiators according to the invention.

The antenna 12 is shown in FIG. 2 in a perspective view and comprises a plurality of radiators 14, a reflector 16, a frame 18 and a support 20.

The radiators 14 are arranged in a two-dimensional grid thus forming an array.

The radiators 14 are mounted to the support 20 which is, for example, a PCB.

At the same time, the support 20 may form the reflector 16. To this end, the support 20 may have a metallization applied to its top side.

The terms "top", "bottom", "up", "down", "above", "below", or the like are used with reference to the radiation direction R of the antenna 12 in the drawings for ease of understanding, but not to restrict the orientation of the antenna 12 when mounted in the cell site 10.

Figure 3:
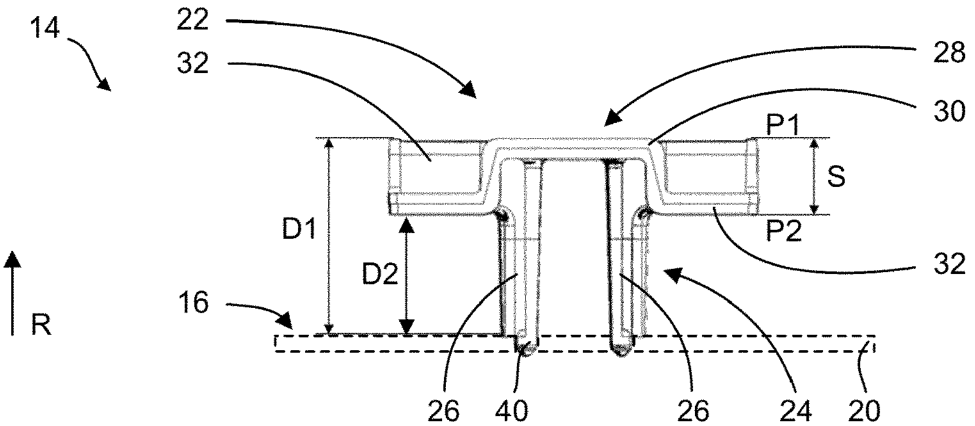
FIG. 3: shows a side view of one of the radiators according to FIG. 2, FIGS. 4, 5: show a top view of the radiator according to FIG. 3, FIGS. 6, 7: show two alternative balun structures of the antenna according to FIG. 2, FIG. 8: shows a very schematic cross-section of the antenna along the line VIII-VIII of FIG. 4, FIGS. 9-11: show a schematic cross section, a perspective top view and a perspective bottom view, respectively, of a second embodiment of a radiator according to the invention.
Figure 4:
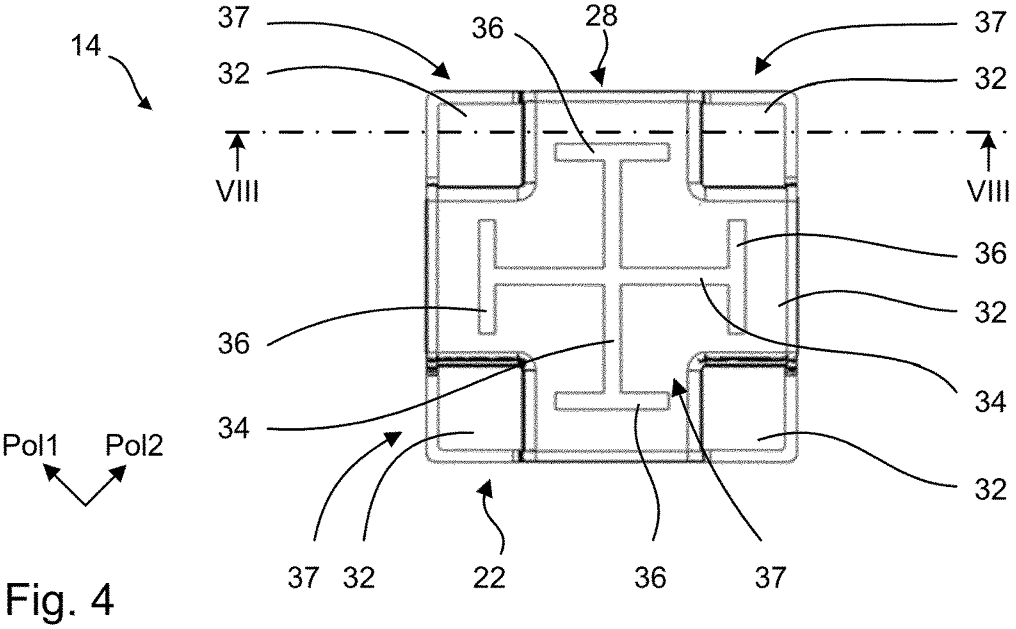
Figure 5:
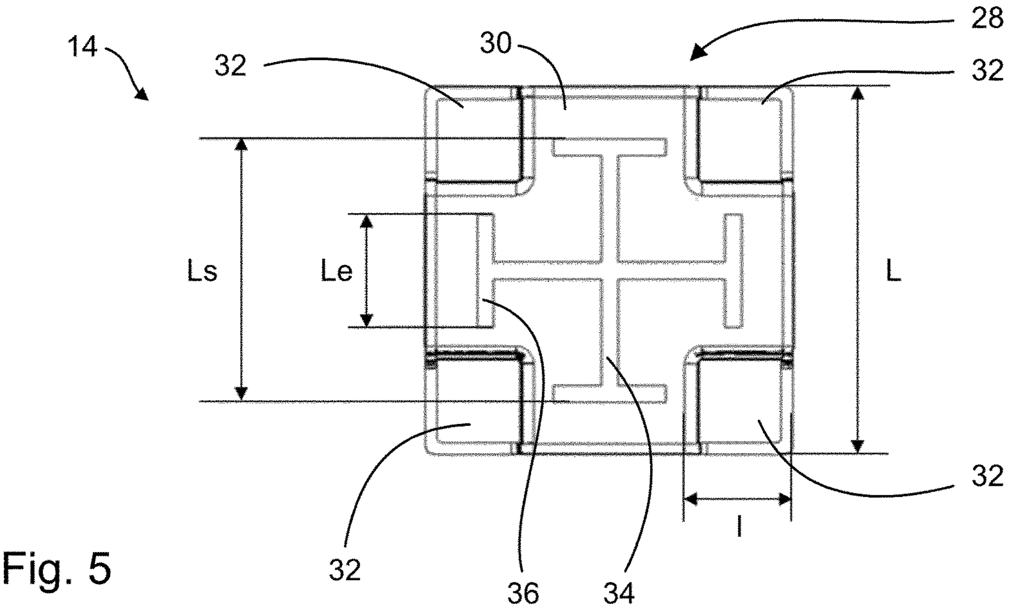

FIG. 3 shows one of the radiators 14 in a side view, wherein the support 20, i.e. the PCB with the metallized reflector 16, is indicated with dashed lines. FIGS. 4 and 5 show the radiator 14 in a top view. They show the same views, except that in FIG. 5 the dimensions of various features are indicated.

The radiator 14 comprises a radiator head 22 and a radiator feed 24.

The radiator 14 is made of a single piece, i.e. the radiator head 22 and the radiator feed 24 together form a single piece.

The radiator 14 may be manufactured by die-casting, deep-drawing, as a stamped-bent part or as an injection molded plastic that has been metallized.

The radiator feed 24 comprises four legs 26 extending from the radiator head 22 to the support 20.

In particular, the legs 26 extend through openings in the support 20 and are galvanically connected to conducting structures, for example balun structures 38, on the bottom side of the support, i.e. the PCB.

The radiator head 22 has an active radiation area 28. The active radiation area 28 has an outer contour in the top view shown in FIGS. 4 and 5. The outer contour may be a rectangle, in the shown embodiment a square.

The active radiation area 28 lies on the top side of the radiator head 22.

The edges of the active radiation area 28 have a length L between ½ and ¼, in particular the length L being ⅓ of the wavelength λ of the center frequency of the design frequency range of the radiator 14. For example, the frequency range for the antenna shown lies between 3.3 GHz and 4.2 GHz.

The length L of the edge may be between 25 mm and 30 mm, in particular the length L is about 28 mm for an average frequency of 3 GHz.

The active radiation area 28 has, in the shown embodiment, a first section 30 and four second sections 32.

The first section 30 and the four second sections 32 are conductively connected.

The first section 30 includes the centroid of the active radiation area 28 and has a cross shape outer contour. The aisles of the cross extend over the full length L of the active radiation area 28 in both directions. The arms are perpendicular to each other.

The second sections 32 are adjoining to parts of the outer edge of the radiation area 28. In the shown embodiment, the second sections 32 are located in each one of the four corners of the active radiation area 28.

Each of the second sections 32 has a square shape in particular having a length l of the edges of the square between 1/11 to 1/6, in particular of 1/10 of a wavelength λ of the center frequency of the design frequency range.

The first section amounts for 60% to 85% of the active radiation area 28 and, in the shown embodiment, the second sections 32 together account for between 15% and 40% of the active radiation area 28.

The first section 30 and the second sections 32 are flat and extend parallel to each other but do not overlap seen in a top view.

The first section 30 extends in a first plane P1, in particular parallel to the reflector 16.

The distance D1 between the first plane P1 and the reflector 16 is between 1/7 and 1/5 of the wavelength λ of the center frequency, in particular the distance D1 is 1/6 of the wavelength λ of the center frequency.

The second sections 32 are also flat and lie in the same plane, called second plane P2 within this disclosure. The second plane P2 is parallel to the first plane P1 but has an offset to the first plane towards the reflector 16.

In other words, the second plane P2 and thus the second sections 32 are closer to the reflector 16 than the first section 30 and the first plane P1.

The offset has a size S between 1/25 and 1/15 of a wavelength λ of the center frequency. In particular, the size S is about 1/20 of the wavelength λ of the center frequency of the design frequency range of the radiator 14.

The second plane P2 lies between 40% and 80%, in particular at 70% of the distance D1 or height between the first plane P1 and the reflector 16.

The radiator feed 24, in particular the legs 26 extend orthogonally to the first plane P1 and the second plane P2. Alternatively, the legs 26 and thus the radiator feed 24 may extend at an oblique angle with respect to the first plane P1.

In the first section 30, two main slots 34 are provided in the radiator head 22.

The main slots 34 extend through the material of the radiator head 22 so that the radiator head 22 has an opening from its topside to its bottom side.

The two main slots 34 each extend parallel to one of the edges of the active radiation area 28. The main slots 34 have a length Ls between 1/3 and 1/2 of the wavelength λ of the center frequency, in particular the length Ls is 1/4 of the wavelength λ of the center frequency of the radiator 14.

The main slots 34 are perpendicular to one another so that they form a cross.

Further, the centroid of the active radiation area 28 forms the center of the cross.

At each end of the main slots 34, an end slot 36 is provided, extending perpendicularly to the respective main slot 34. The main slots 34 merge with the respective end slot 36 at the middle of the end slot 36.

The end slots 36 have a length Le between 1/9 and 1/11 of the wavelength λ. In particular, Le is 1/10 of the wavelength λ of the center frequency of the design frequency range of the radiator 14.

For example, the length Le of the end slots 36 may be the same as the size L of the second sections 32.

The radiator head 22 forms a dual polarized radiator with two pairs of radiation sections 37, in particular two dipoles extending perpendicularly to one another with in total for dipole arms. The main slots 34 separate adjacent radiation sections 37, i.e. dipole arms, from one another. The pair of radiation sections 37, which are diagonally opposite to each other with respect to the centroid of the active radiation area 28, form a dipole.

Thus, the pair of radiation sections 37, i.e. the dipoles, are perpendicularly polarized to one another, in particular with a ±45° polarization. The polarization planes of such a ±45° polarization are indicated in FIG. 3 with Pol1 and Pol2, respectively.

In the top view, as best seen in FIG. 4, the radiator head 22, and in particular the radiator 14, has a fourfold rotational symmetry around the centroid.

The symmetry of the radiator head 22 may also be described as an axial symmetry with respect to two axes extending through the main slots 34.

For each radiation section 37 one of the legs 26 of the radiator 14 is provided which provides a contact from each of the radiation sections 37 to the support 20.

Figure 6:
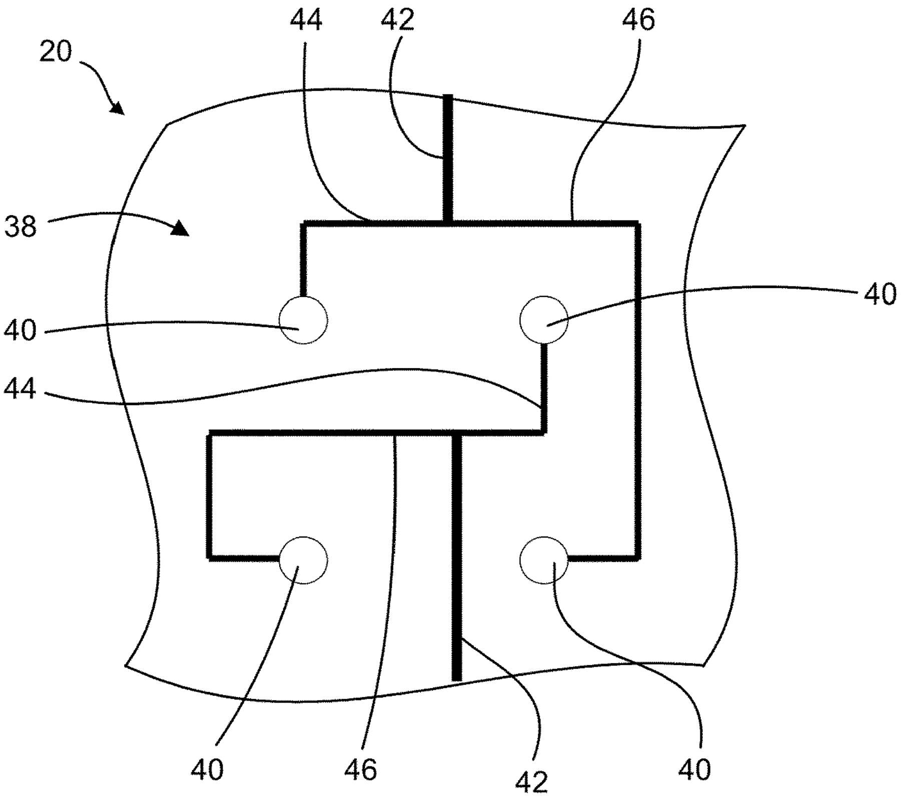

FIG. 6 shows a balun structure 38. The balun structure 38 is, for example, provided on the bottom side of the support 20, i.e. the PCB.

Four contact points 40 can be seen in FIG. 6 corresponding to openings in the support 20 for the legs 26 of the radiator feed 24 or corresponding to the endpoints of the legs 26.

The balun structure 38 has a separate feeding line 42 for each of the pair of radiation sections 37, e.g. each dipole of the radiator head 22.

Each of the feeding lines 42 is galvanically connected to both contact points 40 of the respective pair of radiation sections 37. The feeding lines 42 comprise a short branch 44 and a long branch 46 each, wherein one of the contact points 40 is connected to the short branch 44 and the other contact point 40 is connected to the long branch 46.

The length of the short branch 44 is shorter than the length of the long branch 46 so that the difference of the length between the short branch 44 and the long branch is 1/2 of the wavelength λ of the center frequency, resulting in a phase shift of 180° between the two contact points 40 of each pair of radiation sections 37.

Figure 7:
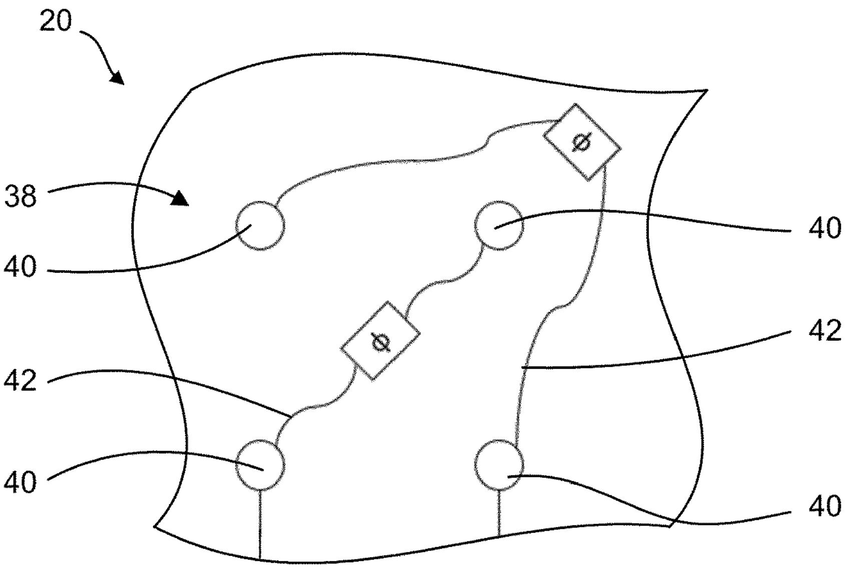

FIG. 7 shows a second embodiment of the balun structure 38 which may also be used instead of the balun structure 38 as shown before.

In this embodiment, the feeding lines 42 galvanically connect the two contact points 40 for each pair of radiation sections 37 in series. Firstly, the feeding line 42 runs to one of the contact points 40 of the respective pair of radiation sections 37 and then to the other contact point 40 of the respective pair of radiation sections 37.

However, the feeding line 42 between the two contact points 40 corresponding to the same pair of radiation sections 37 is provided as a delay line or comprises a delay line generating a phase shift of about 180° as indicated in FIG. 7 by the rectangles labelled with Φ.

Figure 8:
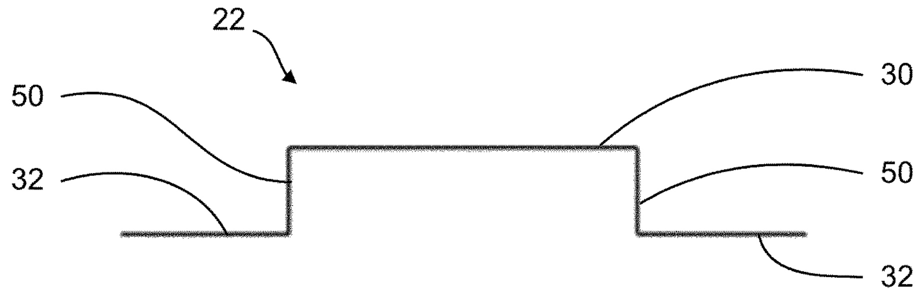

FIG. 8 shows a cross-section along line VIII-VIII of FIG. 4 through the radiator head 22 near the edge of the active radiation area 28, in particular outside the region of the radiator feed 24.

By arranging sections of the active radiation area 28 in a plane closer to the reflector 16, the coupling between the second sections 32 and the reflector 16 is increased. This stronger coupling leads to the effect that the dimensions of the active radiation area 28, i.e. the length L of the edges can be reduced without deteriorating the radiation characteristics compared to a larger active radiation area 28 in a single plane having the same wavelength of the center frequency.

Thus, a more compact design can be achieved.

Figure 9:
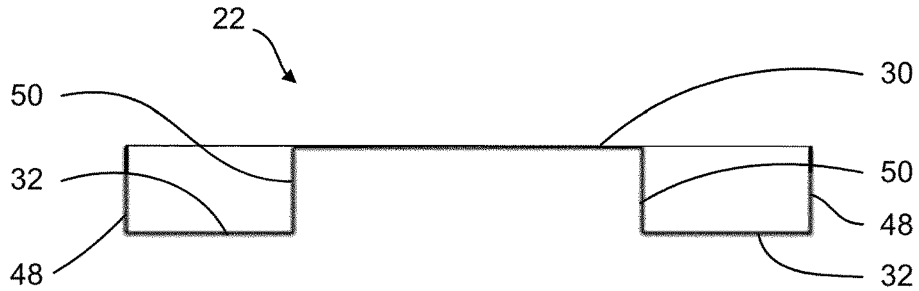
Figure 10:
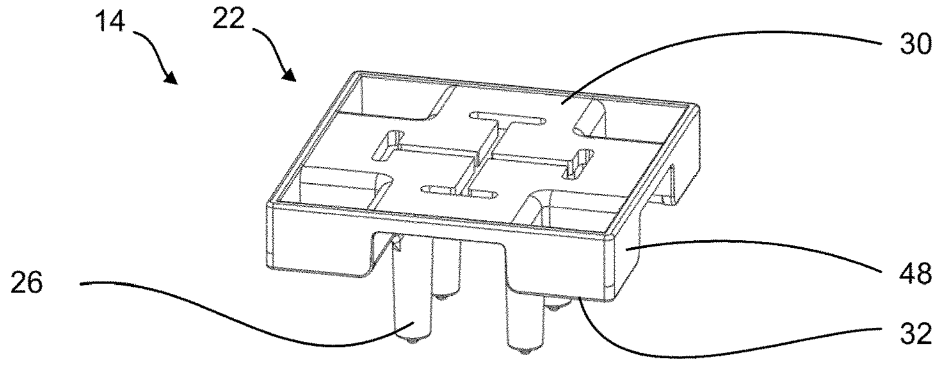
Figure 11:
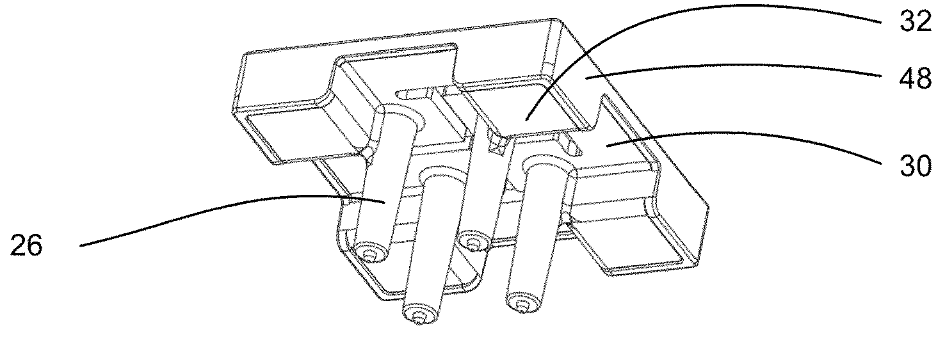

FIGS. 9 to 11 show a second, third and fourth embodiment of the radiator, respectively. The cross section of the FIGS. 9 to 11 correspond to the cross section shown in FIG. 8. The further embodiments correspond in general to the first embodiment so that the same reference signs are used for the same or functionally the same components and only the differences are discussed in the following.

In the second embodiment according to FIG. 9, the radiator head 22 comprises sidewalls 48 which extend at the edge of the active radiation area 28 upwards.

In particular, the sidewalls 48 are perpendicular to the first plane P1 and the second plane P2.

The sidewalls 48 may be present only at edges adjoining the second sections 32, only at edges adjoining the first section 30, at edges adjoining the second sections 32 or the first section 30, or along the full perimeter of the active radiation area 28.

At edges adjoining the second sections 32, the sidewalls 48 extend from the respective second section 32, i.e. the second plane P2, upwards towards the first plane P1, in particular until the first plane P1 has been reached.

The sidewalls 48 in the region of the first section 30 extend from the first section 30, i.e. the first plane P1, downwards towards the second plane P2, in particular until the second plane P2 has been reached.

The sidewalls 48 further increase the beneficial effect of the second sections 32.

FIGS. 10 and 11 show a perspective top view and a perspective bottom view, respectively, of a radiator 14 according to the second embodiment. The sidewalls 48 are only provided at edges adjoining the second sections 32.

Figure 12:
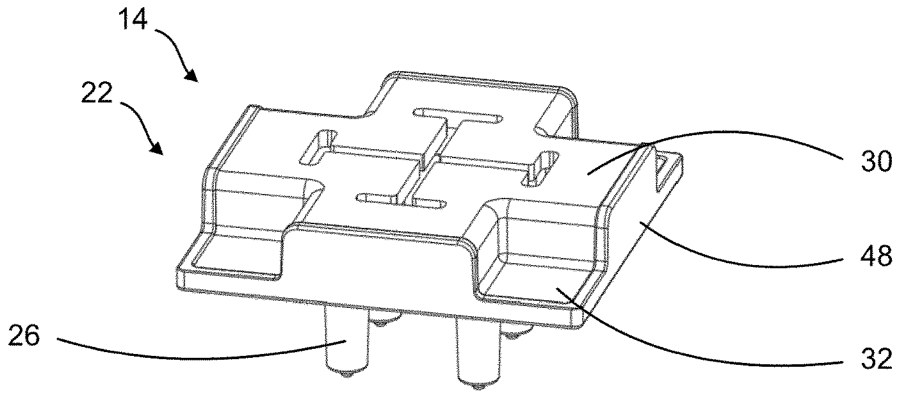
FIGS. 12, 13: show a perspective top view and a perspective bottom view, respectively, of a variant of the second embodiment of a radiator according to the invention.
Figure 13:
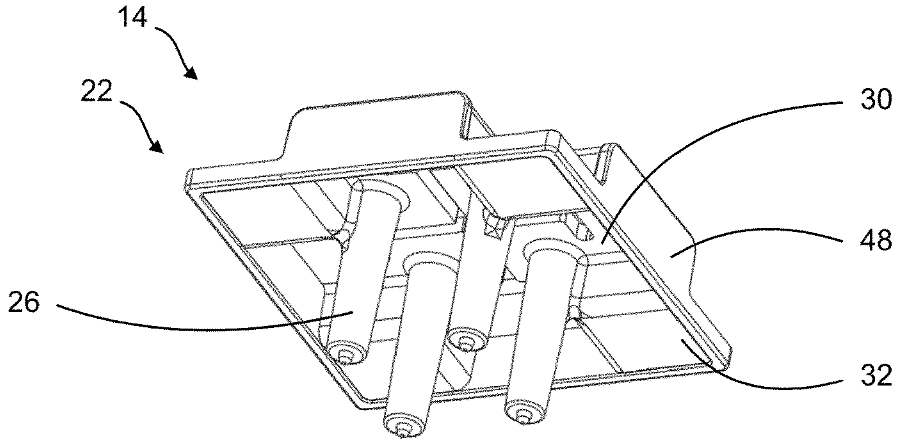

FIGS. 12 and 13 show a perspective top view and a perspective bottom view, respectively, of a radiator 14 similar to the second embodiment. In this embodiment, the sidewalls 48 are only provided at edges adjoining the first sections 30.

Figure 14:
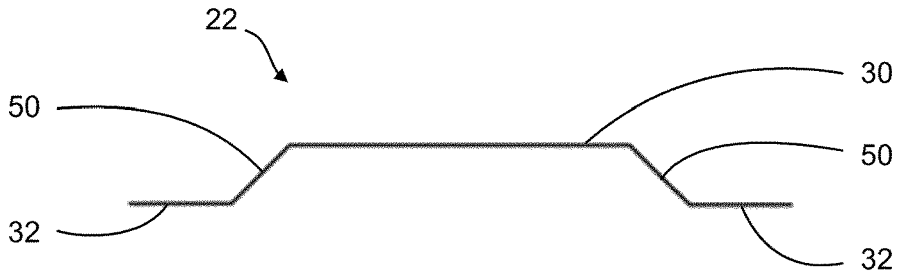
FIGS. 14, 15: show schematically further embodiments of a radiator in a cross-section corresponding to the cross-section shown in FIG. 8.

The third embodiment shown in FIG. 14 corresponds to the first embodiment, wherein the active radiation area 28 comprises transition sections 50.

The transition sections 50 are arranged between the first section 30 and the second section 32, i.e. connecting the first section to the respective second section 32.

The transition sections 50 extend from the first section 30 in the first plane P1 and then, when following the transition section 52 to the outside edge of the active radiation area 28, slope downwardly until the second plane P2 has been reached. There, the second section 32 adjoins the transition section 50.

Thus, in the third embodiment according to FIG. 14, the transition section 50 accounts for space in the active radiation area 28 so that the percentage of the first section 30 plus the percentages of the second section 32 of the active radiation area 28 do not sum up to 100%.

With respect to the first embodiment, it can be said that transition sections 50 are also present in the first embodiment that, however, extend perpendicularly between the first plane P1 and the second plane P2 and thus do not contribute to the active radiation area 28.

The transition sections 50 also contribute to the advantageous radiation properties of the radiator 14.

Figure 15:
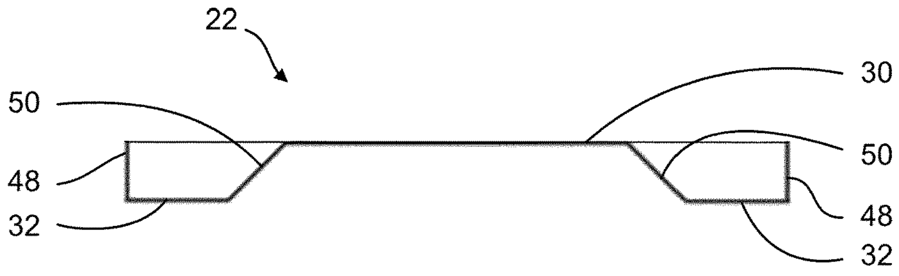

In the fourth embodiment shown in FIG. 15, the sloping transition sections 50 of the third embodiment according to FIG. 14 as well as the sidewalls 48 of the second embodiment according to FIG. 9 are present.

The invention claimed is:

1. A radiator for an antenna, comprising a radiator head with an active radiation area having a first section and at least one second section, wherein the first section and the at least one second section are conductively connected forming a dual polarized radiator together, and wherein the first section lies within a first plane and the at least one second section lies within a second plane offset to the first plane, wherein the radiator head comprises two main slots in the first section, wherein each of the main slots includes a centroid of the active radiation area.

2. The radiator according to claim 1, wherein the second plane lies below the first plane and/or wherein the offset has a size between λ/25 and λ/15, in particular λ/20.

3. The radiator according to claim 1, wherein the first section accounts for between 60% and 85% of the active radiation area.

4. The radiator according to claim 1, wherein the active radiation area has a rectangular contour, in particular a square contour in a top view and/or wherein the radiation area is located on the top side of the radiator head.

5. The radiator according to claim 4, wherein an edge of the active radiation area has a length between λ/2 and λ/4, in particular of λ/3, and/or between 25 mm and 30 mm, in particular of 28 mm.

6. The radiator according to claim 1, wherein the at least one second section is adjoining to the edge of the radiation area, in particular adjoining to a corner of the active radiation area.

7. The radiator according to claim 1, wherein the at least one second section has a rectangular shape, in particular a square shape, particularly with an edge length between λ/11 and λ/9, in particular of λ/10.

8. The radiator according to claim 1, wherein the at least one second section comprises two second sections wherein each of the main slots extend parallel to an edge of the active radiation area, and wherein each of the main slots extends partially in a region between the two second sections.

9. The radiator according to claim 1, wherein at each end of the main slots, an end slot is provided extending transversely, in particular perpendicularly to the respective main slot.

10. The radiator according to claim 1, wherein the radiator head comprises sidewalls at at least parts of the edge of the active radiation area, in particular at the edges adjoining the first sections and/or at the edges adjoining the second sections.

11. The radiator according to claim 1, wherein the radiator head comprises at least one transition section connecting the first section to one second section, wherein the at least one transition section extends perpendicularly between the first plane and the second plane or wherein the transition section is sloping downwards from the first section outwards.

12. The radiator according to claim 1, wherein the radiator comprises a radiator feed connected to the radiator head, wherein the radiator feed extends at an oblique angle or orthogonally to the first plane.

13. The radiator according to claim 12, wherein the radiator feed comprises at least two legs connected to one of the pair of radiation sections of the radiator head, in particular wherein the radiator feed comprises four legs, each connected to a different one of the radiation sections of the pair of radiation sections.

14. The radiator according to claim 1, wherein the radiator is made of a single piece, in particular by die-casting, deep-drawing, as a stamped-bent part or as a metallized injection-molded plastic.

15. The radiator according to claim 1, wherein the radiator head, in particular the full radiator has a rotational symmetry around the centroid of the active radiation area.

16. An antenna, in particular for a mobile communication cell site, comprising the radiator according to claim 1 and a reflector.

17. The antenna according to claim 16, wherein the first plane is further away from the reflector than the second plane, in particular wherein the second plane lies between 40% and 80%, in particular at 70% of the distance seen from the reflector between the first plane and the reflector.

18. The antenna according to claim 16, wherein the antenna comprises a support for the radiator, wherein the radiator feed is connected to the support, in particular wherein a balun structure is provided at the support, the balun structure galvanically connecting to the legs of the radiator feed associated with the same pair of radiation sections.

19. A mobile communication cell site comprising the antenna according to claim 16.

* * * * *